Patented Dec. 22, 1936

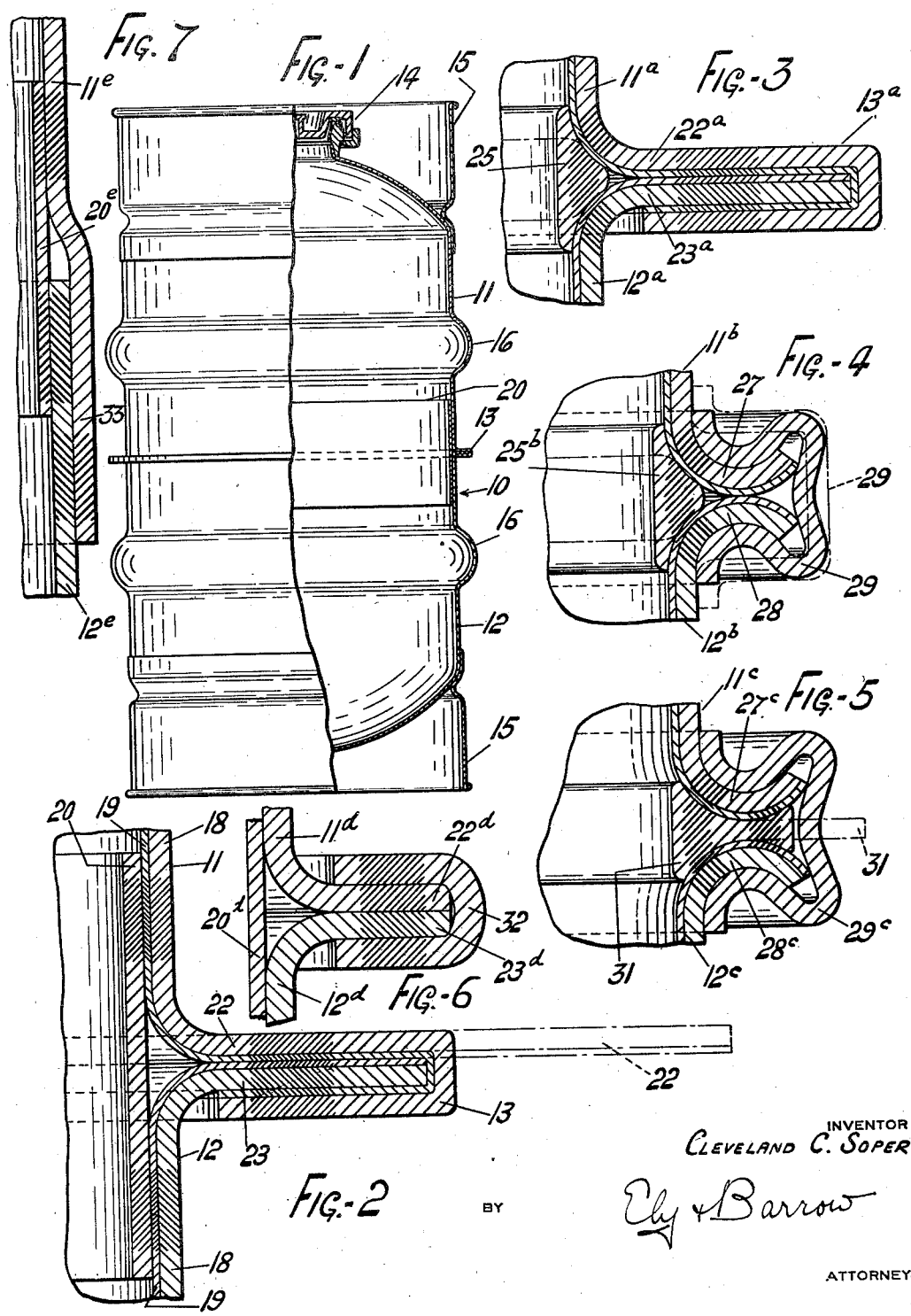

2,065,480

UNITED STATES PATENT OFFICE 2,065,480

METAL CONTAINER AND METHOD OF MAKING THE SAME

Cleveland C. Soper, Kent, Ohio, assignor to The Firestone Steel Products Company, Akron, Ohio, a corporation of Ohio Application April 20, 1933, Serial No. 667,031

16 Claims. (Cl. 113—120)

This invention relates to metal containers such as drums, barrels, and casks, and to methods of making the same, and more especially it relates to barrels made of non-corrodible material such as alloy steel, known in the trade as "stainless" steel, or of composite metal having a lining of such non-corrodible material and known in the trade as stainless-clad steel, or of any other suitable weldable non-corrodible acid-resisting metal, and to procedure for making barrels or other containers of the character mentioned with non-corrodible seams.

The chief objects of the invention are to provide a barrel of the character mentioned which will have a strong circumferential seam capable of resisting strong internal pressure, and capable of withstanding rough and abusive handling to which such containers are subjected; and to provide an improved method of making such a barrel. Another and important object is to provide a barrel composed of non-corrodible metal or metal having a non-corrodible inner surface, and formed with a seam wherein no corrodible metal is exposed to the contents of the barrel. Other objects will be manifest in the following specification.

Of the accompanying drawing:

Figure 1 is a side elevation of a barrel embodying one form of the invention, a part thereof being broken away and in section;

Figure 2 is a detail sectional view, on a larger scale, of the circumferential seam of the barrel; and Figures 3, 4, 5, 6 and 7 are sections similar to Figure 2 illustrating modified barrel seams.

Referring to the drawing, the barrel preferably comprises a container portion 10 that is made from two pieces of metal 11 and 12 respectively that are drawn and formed to proper shape and joined in a circumferential seam 13 centrally of the barrel. The heads of the barrel may be rounded or bulged as shown, and one of the heads may be provided with a bung structure 14. Chimes 15, 15 are mounted on the respective ends of the barrel and secured thereto by welding, said chimes protecting the heads of the barrel and the bung structure 14. The barrel preferably is formed with circumferential ribs or corrugations 16, 16 disposed on opposite sides of its seam to protect the latter and to reinforce the barrel. Each metal piece 11 and 12 may be a composite structure comprising an outwardly disposed lamination 18 of mild steel, and an inwardly disposed lamination 19 of stainless steel or other non-corrodible alloy of chromium steel or other suitable weldable metal. The metal parts of the structure may also be of solid non-corrodible or acid-resisting weldable metal or alloy as illustrated in Figure 6.

The construction of the seam 13 is best shown in Figure 2, wherein it will be seen that interiorly of the barrel, the joint between the two halves thereof is overlain with a relatively wide sleeve or collar 20 of non-corrodible alloy, such as stainless steel. This ring has a reasonably tight fit with the barrel halves and is stitch-welded to each of them. It is initially secured in one barrel-section by first spot-welding at several places around same and then stitch-welding. It thus serves to guide and locate the other section thereonto during the assembly of the barrel.

The welding of the ring 20 to the second section is similarly performed and may be effected while the barrel is supported on an arm extending into the barrel through the bung structure 14. The welded seams are formed by an intermittent spot-welding of the material through a rapid succession of closely spaced welds or stitches progressively travelling along the seam. This seam or stitch-welding is performed under water and where the weld is on the interior of the barrel, the latter is partly filled with water. The seam welded joints are found to be strong, highly stable, liquid-tight, acid-resisting and with little or no change in the austenitic structure adjacent the weld in the stainless material.

The marginal portions of the metal pieces 11 and 12 are flared outwardly to form flanges 22 and 23 respectively, the flange 22 initially being of considerably greater outside diameter than the flange 23, as shown by broken lines in Figure 2. The flanges 22 and 23 are disposed in juxtaposed relation which puts their non-corrodible facings 19 in face to face contact, and are stitch-welded together. That portion of flange 22 initially extending beyond flange 23 is folded or spun over the perimeter of the latter and into face to face contact with the side of said flange, and spot-welded or stitch-welded thereto. The arrangement is such as to provide a permanent interlock of the said flanges whereby the barrel halves are securely joined and the barrel is circumferentially reinforced. The interlocked and welded seam in combination with the interiorly disposed collar 20 provides great strength and rigidity, obviates corrosion of the seam by the contents of the barrel, prevents contamination of the contents of the barrel from the seam, and avoids appreciable irregularities and crevices in which dirt might collect because of difficulty of cleaning.

In the modified construction shown in Figure 3, the seam 13a embodies the same interlocking of the marginal flanges of metal members 11a, 12a as is present in the form of the invention illustrated in Figure 2. Interiorly of the barrel a relatively narrow ring 25 is substituted for the sleeve 20. The ring 25 is of stainless steel or other non-corrodible metal and initially is of the shape shown in broken lines, its outer perimeter being somewhat rounded, and shaped to fit snugly into the circumferential recess formed at the juncture of flanges 22a, 23a. The ring 25 is stitch-welded to members 11a, 12a, and during such welding is swaged to the shape shown in full lines, which swaging widens the ring and forces it firmly into place against the inner surface of the container. The weld through section 11a, ring 25 and section 12a may be simultaneously formed by a single welding operation.

In the modified construction shown in Figure 4, the marginal portions of the barrel members 11b, 12b are outwardly curved to concavo-convex shape as shown at 27, 28 respectively, and are disposed in abutting relation. The said members 11b, 12b are permanently secured to each other by an external band or ring 29 that is crimped about the curved flanges 27, 28, fitting closely into the concave surfaces thereof. The ring 29 may or may not be welded to the barrel flanges. Initially the ring may be endless, or it may be split in which case its ends are joined by welding before it is crimped upon the flanges 27, 28. The initial contour of ring 29 is shown in broken lines in Figure 4. If ring 29 is endless it will initially be large enough to be positioned over flanges 27 and 28. Interiorly of the barrel, the construction shown in Figure 4 comprises a ring 25b that is identical with ring 25 of Figure 3.

In the modified embodiment of the invention shown in Figure 5, the marginal portions of barrel members 11c, 12c are formed with curved flanges 27c, 28c in the same manner as shown in Figure 4. In assembling members 11c, 12c, a ring 31 of non-corrodible metal is positioned between flanges 27c, 28c, said ring being laterally concave so as snugly to fit the adjacent faces of said flanges, and having an inner peripheral face positioned substantially flush with the inner surface of the barrel. The outer peripheral portion of ring 31 initially is flat, as indicated in broken lines, and this portion of the ring is melted down and fused to the flanges 27c, 28c, by arc welding during the assembly of the barrel, thus extending the weld far into the interior of the joint. The weld subsequently is covered and reinforced, preferably by a ring 29c identical with ring 29 shown in Figure 4. If desired, however, the ring 29c may be omitted and the weld covered by other welding of a cheaper nature.

In the modified embodiment of the invention shown in Figure 6 flanges 22d and 23d on barrel portions 11d and 12d are flared outwardly and joined together and reinforced by a channel ring 32, the ring and flanges being spot or seam-welded. The interior of the joint is covered by a ring 20d similar to ring 20 in Figure 2.

In the modified embodiment of the invention shown in Figure 7 barrel portion 11e is formed with a circumferential portion 33 of slightly larger diameter whereby barrel portion 12e may be telescoped therein. Prior to the assembly of the barrel portions a ring 20e similar to ring 20 in Figure 2 is seam-welded to the margin of barrel portion 12e so that one-half of the ring projects beyond the barrel edge. The two barrel portions are then telescoped as shown and the telescoped parts of the barrel portions seam-welded together. Ring 20e is then seam-welded at its other edge to barrel portion 11e.

Other modifications may be resorted to without departing from the spirit of the invention, or the scope of the appended claims which are not limited wholly to the specific construction shown.

What is claimed is:

1. A barrel comprising two hollow composite metal sections including inwardly disposed layers of non-corrodible chromium steel alloy, the marginal portions of the respective sections being formed with outwardly extending flanges that are welded to each other with the non-corrodible layers in contact, and a ring of non-corrodible chromium steel alloy on the interior of the barrel overlying the juncture of said sections, said ring being welded to both sections.

2. A barrel comprising two hollow composite metal sections including non-corrodible lining layers, the marginal portions of the respective sections being formed with outwardly extending flanges that are permanently secured to each other exteriorly of the barrel, the juncture of the two sections forming a crevice therebetween, and a ring of non-corrodible material on the interior of the barrel swaged firmly into the crevice formed at the juncture of the two sections.

3. A barrel comprising two hollow composite metal sections including non-corrodible lining layers, the marginal portions of the respective sections being formed with outwardly extending flanges, one of said flanges projecting radially beyond the other flange and being spun over the latter exteriorly of the barrel to hold the sections permanently together, the juncture of the two sections forming a crevice therebetween, and a ring of non-corrodible material interiorly of the barrel fitting the crevice formed at the juncture of the two sheets.

4. A barrel comprising two hollow composite metal sections including non-corrodible lining layers, the marginal portions of the sections being formed with outwardly extending flanges, and a ring of non-corrodible metal disposed between said flanges having its inner perimeter substantially flush with the inner surface of the barrel and being fused to the said flanges at its outer perimeter, exteriorly of the barrel.

5. The method of making a metal container which comprises forming two composite metal sheets comprising non-corrodible facing layers into barrel halves with the non-corrodible layer disposed interiorly thereof, forming marginal flanges on said sheets, assembling the barrel halves with the non-corrodible layers of said flanges in contact and confining in the barrel a ring of non-corrodible metal, permanently securing the juxtaposed flanges to each other, the juncture of the two sections forming a crevice therebetween, securing the internal ring to each barrel half in position overlying the crevice at the juncture of the said barrel halves, and welding respective margins of said ring to each barrel half by a continuous seam of spot welds.

6. The method of making a metal container which comprises forming two metal sheets into barrel halves with annular marginal flanges, welding an annular metal band to one of said barrel halves leaving a portion of said band projecting axially beyond the flange thereon, assembling the second barrel half over the projecting portion of said band, welding said flanges to each other exteriorly of the barrel, and welding said projecting portion of said band to said second barrel half.

7. A barrel comprising two hollow metal sections, the marginal portions of the respective sections being formed with outwardly extending flanges, which flanges are permanently united by a continuous seam of spot welds, and a ring on the interior of the barrel overlying the juncture of the said sections, said ring being permanently united with said sections.

8. A barrel comprising two hollow non-corrodible metal sections, the marginal portions of the respective sections being formed with outwardly extending flanges that are welded to each other, and a ring of non-corrodible alloy on the interior of the barrel overlying the juncture of said sections, said ring being welded to both sections.

9. A barrel comprising two hollow metal sections, the marginal portions of the respective sections being formed with outwardly extending flanges that are permanently secured to each other exteriorly of the barrel, the juncture of the two sections forming a crevice therebetween and a metal ring on the interior of the barrel swaged firmly into the crevice formed at the juncture of the two sections.

10. A barrel comprising two hollow metal sections, the marginal portions of the respective sections being formed with outwardly extending flanges that are permanently secured to each other exteriorly of the barrel, and a metal ring on the interior of the barrel swaged firmly into the crevice formed at the juncture of the two sections, said ring being welded to each of the sections by a continuous series of spot welds.

11. A barrel comprising two hollow metal sections, the marginal portions of the sections being formed with outwardly extending flanges, and a metal ring disposed between said flanges having its inner perimeter substantially flush with the inner surface of the barrel and being fused to the said flanges at its outer perimeter, exteriorly of the barrel.

12. The method of making a metal container which comprises forming two metal sheets into barrel halves, forming marginal flanges on said sheets, assembling the barrel halves and confining in the barrel a metal ring, permanently securing the juxtaposed flanges to each other, the juncture of the two sections forming a crevice therebetween securing the internal ring to each barrel half in a position overlying the crevice at the juncture of the said barrel halves, and welding respective margins of said ring to each barrel half by a continuous seam of spot welds.

13. The method of making a metal container which comprises forming two metal sheets into barrel halves with annular marginal flanges, assembling said barrel halves and confining a metal ring inside the barrel, permanently securing said flanges to each other exteriorly of the barrel, the juncture of the two sections forming a crevice therebetween, and then swaging the inner ring into the crevice at the juncture of the barrel halves and concurrently welding said ring to the barrel.

14. The method of making a metal container which comprises forming two metal sheets into barrel halves with annular marginal flanges, assembling said barrel halves and confining a metal ring inside the barrel, permanently securing said flanges to each other exteriorly of the barrel by crimping a metal channel ring upon them, the juncture of the two sections forming a crevice therebetween, and then swaging the inner ring into the crevice at the juncture of the barrel halves and concurrently welding said ring to the barrel.

15. The method of making a metal container which comprises forming two metal sheets into barrel halves with annular marginal flanges, assembling said barrel halves upon a metal ring disposed between the flanges of the barrel halves, and then fusing the outer peripheral portion of said ring to said flanges, exteriorly of the barrel.

16. The method of making a metal container which comprises forming two metal sheets into barrel halves with annular marginal flanges, assembling said barrel halves upon a metal ring disposed between the flanges of the barrel halves, fusing the outer peripheral portion of said ring to said flanges, exteriorly of the barrel, and crimping a metal ring upon the barrel flanges to conceal and mechanically reinforce the fused connection between the barrel halves.

CLEVELAND C. SOPER.